United States Patent
Aase et al.

(10) Patent No.: US 7,147,269 B2
(45) Date of Patent: Dec. 12, 2006

(54) AIRFLOW CONTROL DEVICES USING CURRENT

(75) Inventors: Jan H. Aase, Oakland Township, MI (US); Alan L. Browne, Grosse Pointe, MI (US); Nancy L. Johnson, Northville, MI (US); John C. Ulicny, Oxford, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/436,315

(22) Filed: May 18, 2006

(65) Prior Publication Data

US 2006/0202508 A1  Sep. 14, 2006

Related U.S. Application Data

(62) Division of application No. 10/872,327, filed on Jun. 18, 2004, now Pat. No. 7,059,664.

(60) Provisional application No. 60/526,785, filed on Dec. 4, 2003.

(51) Int. Cl.
  *B60J 1/00* (2006.01)
(52) U.S. Cl. .............. 296/180.1; 296/180.5; 244/204
(58) Field of Classification Search ............. 296/180.1, 296/180.5; 244/200, 203
  See application file for complete search history.

(56) References Cited

U.S. PATENT DOCUMENTS

| | | | |
|---|---|---|---|
| 2,184,798 A | 12/1939 | Gracey | 296/91 |
| 3,816,774 A * | 6/1974 | Ohnuki et al. | 310/332 |
| 4,052,099 A | 10/1977 | Lowery et al. | 296/91 |
| 4,119,339 A | 10/1978 | Heimburger | 296/180.5 |
| 4,131,308 A | 12/1978 | Holka et al. | 196/180.5 |
| 4,170,377 A | 10/1979 | Ingram | 296/180.5 |
| 4,460,213 A | 7/1984 | Janssen et al. | 296/180.5 |
| 4,489,806 A | 12/1984 | Shimomura | 296/180.5 |
| 4,558,897 A | 12/1985 | Okuyama et al. | 296/180.5 |
| 4,659,130 A | 4/1987 | Dimora et al. | 296/180.1 |
| 4,660,879 A * | 4/1987 | Kobayashi et al. | 296/180.5 |
| 4,778,212 A | 10/1988 | Tomforde | 296/180.1 |
| 4,810,022 A | 3/1989 | Takagi et al. | 296/180.5 |
| 4,902,067 A | 2/1990 | Sakai et al. | 296/180.1 |
| 4,976,489 A | 12/1990 | Lovelace | 296/180.1 |
| 5,150,864 A * | 9/1992 | Roglin et al. | 244/219 |
| 5,292,166 A | 3/1994 | Emery | 296/180.5 |
| 5,454,619 A | 10/1995 | Haraway, Jr. | 296/180.1 |
| 5,558,304 A * | 9/1996 | Adams | 244/134 A |

(Continued)

*Primary Examiner*—Kiran B. Patel
(74) *Attorney, Agent, or Firm*—Kathryn A. Marra (57) ABSTRACT

An airflow control device comprises a body and an active material in operative communication with the body. The active material, such as a shape memory material, is operative to change at least one attribute in response to an activation signal. The active material can change its shape, dimensions and/or stiffness producing a change in at least one feature of the airflow control device such as shape, dimension, location, orientation, and/or stiffness to control vehicle airflow to better suit changes in driving conditions such as the need for increased airflow through the radiator due to increases in engine coolant temperature. As such, the device improves vehicle fuel economy while maintaining proper engine cooling. An activation device, controller and sensors may be employed to further control the change in at least one feature of the airflow control device such as shape, dimension, location, orientation, and/or stiffness of the device. A method for controlling vehicle airflow selectively introduces an activation signal to initiate a change of at least one feature of the device that can be reversed upon discontinuation of the activation signal.

4 Claims, 6 Drawing Sheets

U.S. PATENT DOCUMENTS

| | | | |
|---|---|---|---|
| 5,632,841 A | 5/1997 | Hellbaum et al. ........... 156/245 |
| 5,662,294 A * | 9/1997 | Maclean et al. ............. 244/201 |
| 5,692,796 A | 12/1997 | Yamamoto et al. ....... 296/180.1 |
| 5,803,409 A * | 9/1998 | Keefe .......................... 244/201 |
| 5,983,944 A * | 11/1999 | Niv .............................. 244/204 |
| 5,988,568 A | 11/1999 | Drews ...................... 296/180.1 |
| 6,033,010 A | 3/2000 | Preiss ....................... 296/180.1 |
| 6,139,090 A | 10/2000 | Stidd ........................ 296/180.5 |
| 6,174,025 B1 | 1/2001 | Henderson et al. .......... 296/217 |
| 6,196,620 B1 | 3/2001 | Haraway, Jr. ............. 296/180.5 |
| 6,209,947 B1 | 4/2001 | Rundels et al. ........... 296/180.1 |
| 6,236,139 B1 * | 5/2001 | Hill et al. .................... 310/307 |
| 6,378,932 B1 | 4/2002 | Fasel et al. ............... 296/180.5 |
| 6,427,948 B1 * | 8/2002 | Campbell .................... 244/204 |
| 6,484,971 B1 * | 11/2002 | Layukallo .................... 244/200 |
| 6,520,564 B1 | 2/2003 | Liang ....................... 296/180.5 |
| 6,712,425 B1 | 3/2004 | Brulhart ................... 296/180.1 |
| 6,833,656 B1 * | 12/2004 | Hooley et al. ............... 310/369 |
| 6,863,242 B1 * | 3/2005 | Van De Kreeke et al. .. 244/7 R |
| 6,926,346 B1 * | 8/2005 | Wong et al. .............. 296/180.1 |
| 6,948,910 B1 * | 9/2005 | Polacsek ........................ 416/1 |
| 2004/0197519 A1 * | 10/2004 | Elzey et al. ................... 428/68 |
| 2005/0198907 A1 * | 9/2005 | McKnight et al. ......... 49/475.1 |

* cited by examiner

AIRFLOW CONTROL DEVICES USING CURRENT

CROSS REFERENCE TO RELATED APPLICATIONS

This application is a divisional of U.S. patent application Ser. No. 10/872,327, filed on Jun. 18, 2004, now U.S. Pat. No. 7,059,664 which relates to and claims priority to U.S. Pat. Ser. No. 60/526,785, filed on Dec. 4, 2003, incorporated herein by reference in its entirety.

BACKGROUND

The present disclosure relates to devices for controlling vehicle airflow and, more particularly, to devices for controlling vehicle airflow which can be adjusted through changes in active materials in response to varying conditions, the adjustment being affected through shape, dimension and/or stiffness changes in the active material.

Airflow over, under, around, and/or through a vehicle can affect many aspects of vehicle performance including vehicle drag, vehicle lift and down force, cooling/heat exchange for a vehicle powertrain, air conditioning systems, and brakes. Reductions in vehicle drag improve fuel economy. Vehicle lift and downforce can affect vehicle stability and handling. As used herein, the term "airflow" refers to the motion of air around and through parts of a vehicle relative to either the exterior surface of the vehicle or surfaces of elements of the vehicle along which exterior airflow can be directed such as surfaces in the engine compartment. The term "drag" refers to the resistance caused by friction in a direction opposite that of the motion of the center of gravity for a moving body in a fluid. The term "lift" as used herein refers to the component of the total force due to airflow relative to a vehicle acting on the vehicle in a vertically upwards direction. The term "downforce" used herein refers to the component of total force due to airflow relative to the vehicle acting on a vehicle in a vertically downward direction.

Devices known in the art of vehicle manufacture to control airflow relative to a vehicle are generally of a predetermined, non-adjustable geometry, location, orientation and stiffness. Such devices generally do not adapt as driving conditions change, thus the airflow relative to the vehicle cannot be adjusted to better suit the changing driving conditions. Additionally, current under-vehicle airflow control devices can reduce ground clearance. Vehicle designers are faced with the challenge of controlling the airflow while maintaining sufficient ground clearance to avoid contact with and damage by parking ramps, parking blocks, potholes, curbs and the like. Further, inclement weather, such as deep snow slush or rainfall, can damage the device and/or impair vehicle handing.

Current stationary airflow control devices may be adjustable by mounting and/or connecting the devices to hydraulic, mechanical, electrical actuators and/or the like. For example, some vehicle spoilers may adjust location and/or orientation in response to an actuator signal. However, such actuators generally require additional components such as pistons, motors, solenoids and/or like mechanisms for activation, which increase the complexity of the device often resulting in an increased number of failure modes as well as increased maintenance and manufacturing costs. Therefore, there exists a need for an adjustable device for controlling vehicle airflow under varying driving conditions that enhances device simplicity while reducing device problems and the number of failure modes.

BRIEF SUMMARY

Disclosed herein are airflow control devices for vehicles. In one embodiment, a process for controlling airflow through and/or across a component comprises disposing at least one louver positioned in an airflow path, wherein the at least one louver comprises a shape memory polymer or a shape memory alloy and at least one resistive wire embedded in the shape memory polymer; and selectively flowing current through the at least one resistive wire and heating the shape memory polymer or flowing current through the shape memory alloy and heating the shape memory alloy to a temperature effective to change at least one attribute, wherein the change in at least one attribute selectively increases or decreases the airflow through the airflow path.

The above described and other features are exemplified by the following figures and detailed description.

BRIEF DESCRIPTION OF THE DRAWINGS

Referring now to the figures, which are meant to be exemplary embodiments, and wherein the like elements are numbered alike.

DETAILED DESCRIPTION OF THE PREFERRED EMBODIMENT

The present disclosure provides an airflow control device for a vehicle, wherein the airflow control device is capable of reversibly changing shape, dimension, orientation, location and/or stiffness, the change being effected through the activation of an active material, allowing the airflow control device to adapt to varying driving conditions. As will be described herein, the airflow control device can be configured to actively sense and respond, thereby requiring no external power source, or alternatively, be configured as an actuator in operative communication with a power source.

Figure 1:
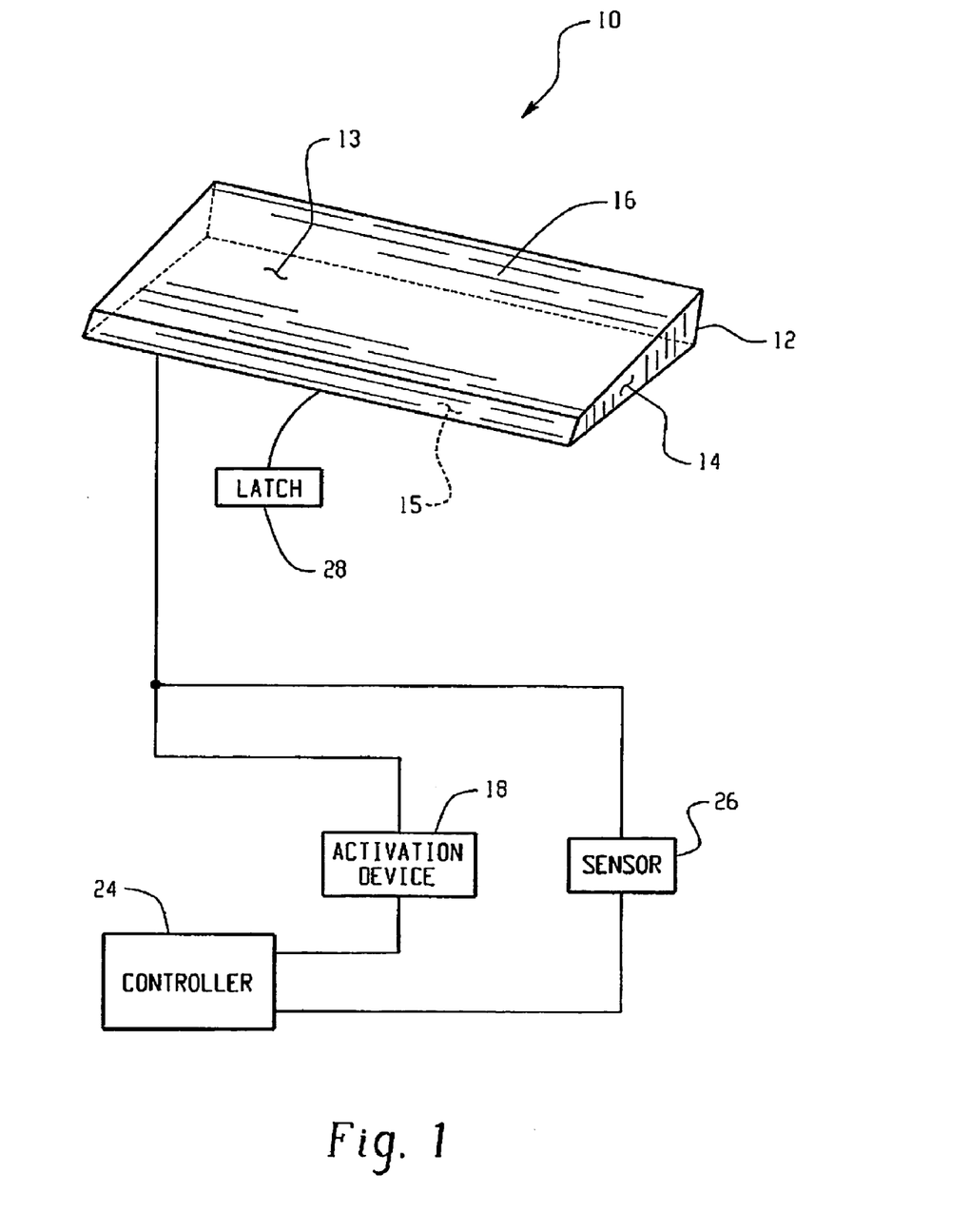
FIG. 1 is a perspective view of an airflow control device in accordance with the present disclosure.

As shown in FIG. 1, an airflow control device for a vehicle (also referred to herein as an air deflector), generally indicated as reference numeral 10, comprises a body portion 12 having at least one surface 13, 14, 15 and an active material 16 in operative communication with at least one surface 13, 14, 15 and/or the body 12, the active material 16 having at least one attribute that is operative to change in response to an activation signal to the active material 16. An attribute of the active material 16, and changes thereof, refer to characteristics of the active material 16 such as, but not limited to, shape, dimension, stiffness, combinations thereof, and the like. The changes in at least one attribute of the active material 16 affect various features of the airflow device 10 such as, but not limited to, shape, dimension, location, orientation, stiffness, combinations thereof, and/or the like, resulting in a change in the airflow across the device 10. In this manner, the device 10 is adjustable and airflow across the device 10 changes with the change in at least one attribute of the active material 16 under varying driving conditions.

The device 10 may be of any of a variety of configurations, including but not limited to air dam, fender flare, side skirt, crib, cab, rear and tailgate spoilers, louvers for controlling airflow through the radiator, other heat exchangers, the engine compartment, fuel cell compartment, fuel cell, fuel cell cooling system, wheel wells, over the drive train and transmission, air and wind deflectors for roof top, sunroof vent windows, louvers in the wheel well which are adapted to effect brake cooling, and the like. An exemplary air dam comprises a projection of the body shell underneath the front of the chassis of a vehicle and functions to reduce the amount of air turbulence and drag underneath the vehicle, as well as channels cooling air to the radiator. Further, many airflow control devices, and air deflectors in particular, improve vehicle stability and increase gas mileage. It will be understood that the device 10 may be a portion of a vehicle louver system and/or an independent component of the vehicle.

The body 12 (also referred to herein as an air deflecting body) may be any of a variety of materials and configurations that enable the airflow device 10 to function, and may further comprise at least one surface 13, 14, or 15. In one embodiment, the body 12 is comprised of a flexible material that exhibits adequate flexibility to operate as an adjustable airflow control device as the active material 16 changes at least one attribute. In an additional embodiment, the body 12 may comprise one or more active material 16. The active material 16 may change at least one attribute in response to an activation signal, and revert back to the original state of the at least one attribute upon discontinuation of the activation signal, or, for the classes of active materials that do not automatically revert upon discontinuation of the activation signal, alternative means can be employed to revert the active materials to their original state as will be discussed in detail herein. In this manner, the airflow control device 10 functions to adjust to changing driving conditions while increasing device 10 simplicity and reducing the number of failure modes.

Active material 16 includes those compositions that can exhibit a change in stiffness properties, shape and/or dimensions in response to the activation signal, which can take the type for different active materials 16, of electrical, magnetic, thermal and like fields. The activation signal can be passive or active. That is, the activation signal can be actively applied to the shape memory material such as by application of a current to a resistive wire in operative communication with the shape memory material or may be indirectly applied, such as by immersion in an engine coolant, immersion in the operating temperatures of the vehicle, and the like. Preferred active materials 16 include but are not limited to the class of shape memory materials, and combinations thereof. Shape memory materials generally refer to materials or compositions that have the ability to remember their original at least one attribute such as shape, which can subsequently be recalled by applying an external stimulus, as will be discussed in detail herein. As such, deformation from the original shape is a temporary condition. In this manner, shape memory materials can change to the trained shape in response to an activation signal. Exemplary active materials include shape memory alloys, shape memory polymers, actuators such as electroactive polymers and piezoelectrics, magnetorheological compositions and the like.

Shape memory alloys (SMA's) generally refer to a group of metallic materials that demonstrate the ability to return to some previously defined shape or size when subjected to an appropriate thermal stimulus. SMAs are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be plastically deformed and upon exposure to some higher temperature will transform to an austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior. A magnetic field can also be applied to change shape, dimension, stiffness, and combinations thereof, to SMAs that are sensitive to the applied magnetic field such, as, for example, ferromagnetic SMAs.

Shape memory polymers (SMPs) are known in the art and generally refer to a group of polymeric materials that demonstrate the ability to return to some previously defined shape when subjected to an appropriate thermal stimulus. Shape memory polymers are capable of undergoing phase transitions in which their shape is altered as a function of temperature. Generally, SMPs have two main segments, a hard segment and a soft segment. The previously defined or permanent shape can be set by melting or processing the polymer at a temperature higher than the highest thermal transition followed by cooling below that thermal transition temperature. The highest thermal transition is usually the glass transition temperature (Tg) or melting point of the hard segment. A temporary shape can be set by heating the material to a temperature higher than the Tg or the transition temperature of the soft segment, but lower than the Tg or melting point of the hard segment. The temporary shape is set while processing the material at the transition temperature of the soft segment followed by cooling to fix the shape. The material can be reverted back to the permanent shape by heating the material above the transition temperature of the soft segment.

The active material 16 may also comprise an electroactive polymer such as an ionic polymer metal composite, a conductive polymer, a piezoelectric material, and the like. As used herein, the term "piezoelectric" is used to describe a material that mechanically deforms when a voltage potential is applied, or conversely, generates an electrical charge when mechanically deformed.

Suitable active materials also comprise magnetorheological (MR) compositions, such as MR elastomers, which are known as "smart" materials whose rheological properties can rapidly change upon application of a magnetic field. MR elastomers are suspensions of micrometer-sized, magnetically polarizable particles in a thermoset elastic polymer or rubber. The stiffness of the elastomer structure is accomplished by changing the shear and compression/tension moduli by varying the strength of the applied magnetic field. The MR elastomers typically change modulus when exposed to a magnetic field in as little as a few milliseconds. Discontinuing the exposure of the MR elastomers to the magnetic field reverses the process and the elastomer returns to its lower modulus state.

The device 10, illustrated in FIG. 1, may comprise one or more active materials 16 applied, such as a coating, a layer and/or sections such as strips of active material 16, to at least one surface 13, 14, and/or 15 of the body 12. In one embodiment, different active materials are applied to a surface 13, 14, 15, wherein the different active materials 16 are applied adjacent to one another. In another embodiment, the active material 16 may comprise a composite of different shape memory materials. In either embodiment, the active material 16 provides the airflow device 10 with a shape changing capability that can be actively-tuned to a particular application, as will be described in greater detail.

Coupled to and in operative communication with airflow device 10 is an activation device 18. The activation device 18 is in functional communication with the airflow device 10 and/or active material 16, which is operable to selectively provide an activation signal to the airflow control device 10 and change a feature of the airflow device 10 by changing at least one attribute of the active material 16. For example, in the case of an underflow airflow device, the active material 16 can retract or extend the airflow device 10 depending on the speed of the vehicle. The activation device 18, on demand, provides the activation signal or stimulus to the active material 16 of the airflow device 10 to cause the change in one or more feature of at least a portion of the device 10. In one embodiment, the change in feature generally remains for the duration of the applied activation signal. Upon discontinuation of the activation signal, the active material 16 generally reverts to an unpowered form and returns substantially to the original at least one attribute, thus reverting the airflow device 10 to the original feature and/or features. In another embodiment, the change in one or more attributes of the active material 16 and/or feature of at least a portion of the device 10 may remain upon discontinuing the activation signal. In this embodiment, the device 10 includes a means to maintain the change in active material 16, such as a latch 28, lock, stop and/or the like. Upon release of the means, the device 10 reverts back to the original at least one feature. The illustrated device 10 is exemplary only and is not intended to be limited to any particular shape, size, dimension or configuration, material, or the like.

In another embodiment, the airflow device 10 includes at least one sensor 26 in operative communication with the airflow control device 10 and/or the active material 16, wherein the sensor is adapted to transmit signals indicative of at least one vehicle condition. This embodiment may further comprise a controller 24 that is operatively connected to the sensor 26 and activation device 18, wherein the controller is programmed and configured to cause the activation device 18 to provide an activation signal to the active material 16 when the sensor 26 signals indicate a predetermined vehicle condition, e.g., temperature of the fuel cell or radiator cooling system.

The active material 16 may comprise any of a variety of active materials, including but not limited to shape memory materials, e.g., shape memory alloys, shape memory polymers, and electroactive polymers such as ionic polymer metal composites, conductive polymers, and piezoelectric material, magnetorheological (MR) compositions, such as MR elastomers, and other like materials that can exhibit a change in at least one attribute upon receiving an activation signal. The present disclosure is not intended to be limited to any particular active material 16 and/or combinations of active materials 16. Likewise, the present disclosure is not intended to be limited to any particular activation signal. The particular activation signal will depend on the sensitivity of the active material 16. As such, the activation signal may include a thermal activation signal, magnetic activation signal, electrical activation signal, chemical activation signal, and/or other like activation signal. Again, as previously disclosed, the term "in response to the activation signal" is intended to include passive as well as active means for providing changes in shape, dimension, stiffness, and combinations thereof.

Figure 2A:
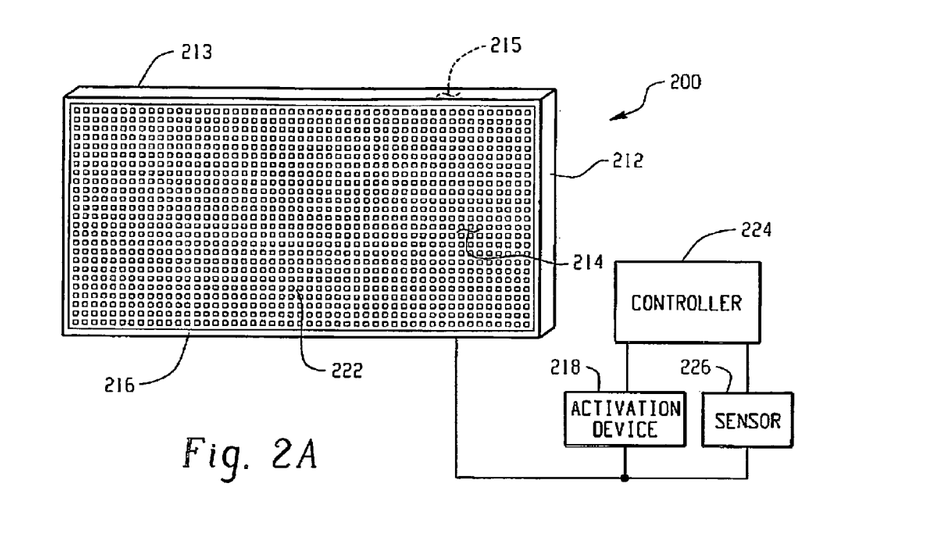
FIGS. 2A and 2B are perspective views of an airflow control device having an active material on a surface in accordance with the present disclosure.
Figure 2B:
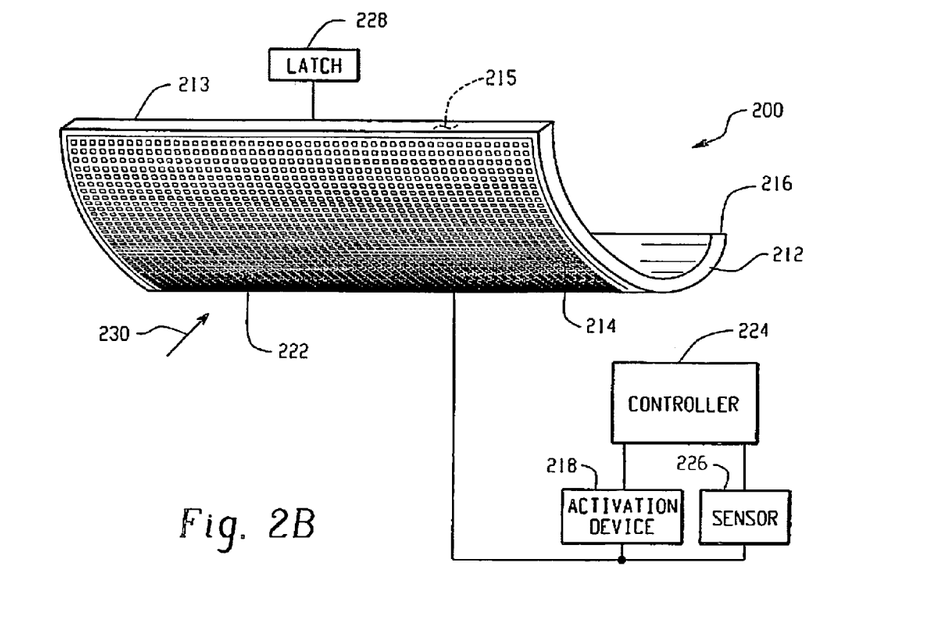

As shown in FIGS. 2A and 2B, perspective views of an airflow control device designated as reference numeral 200 may comprise a body 212 having one or more surfaces 213, 214, and 215 to control airflow. In one embodiment, the body 212 of the airflow device 200 is formed of active material 216. In another embodiment, the body 212 may be formed entirely of the active material 216 or other suitable compositions having one or more surfaces 213, 214, 215 comprising one or more active materials 216. The active materials 216 in this device 200 as shown in FIG. 2A, may have a substantially straight shape at room temperature and, as shown in FIG. 2B, a curved shape (i.e. curvilinear shape) when heated above a temperature range that may be generally encountered during vehicle operation. In this view, the airflow device 200 may control airflow such as is provided in the direction indicated by arrow 230 while maintaining sufficient ground clearance to avoid contact with and damage by road hazards and inclement weather residue. The linear shape shown in FIG. 2A is effective for preventing the flow of air whereas the curvilinear shape as shown in FIG. 2B provided by activation of the active material 216 can provide increased airflow relative to the linear shape.

In one embodiment, one or more wires 222 are embedded in the active material 216 of the device 200 to provide a thermal activation means in the form of resistive heating. As shown, the wires 222 are shown in the form of a mesh like screen to facilitate uniform heating of the body 212, which is formed of thermally active material 216, e.g., shape memory polymer. Although a mesh like form is shown, other variations such as wires, films, and the like are contemplated, the configurations of which are well known and within the skill of those in the art of resistive heating. The wires heat up when an electric current passes through them due to electrical resistance, which is transferred directly to the thermally active material to effect a change in at least one attribute thereof. In additional embodiments, controls such as controller 224 and/or sensor 226 may cause a current to flow through the embedded wires 222 at low driving speed causing the active material 216 to curve upward, assuming a trained higher temperature shape. This may result in a rise in the airflow control device 200 and in doing so increase vehicle ground clearance. Further, when driving above a predetermined speed, the controller 224 may discontinue the current and allow the airflow control device 200 to cool, and thus straighten and deploy. In another embodiment, the change in feature may be reversed such that at higher vehicle speed heating may be employed to achieve a high temperature shape, and current would be discontinued at lower vehicle speed to achieve a low temperature shape. In another embodiment, the change in one or more attribute of the active material 216 and/or feature of the device 200 may remain upon discontinuing the activation signal. In this embodiment, the device 200 includes a means to maintain the change in active material 216, such as a latch 228, lock, stop and/or the like. Upon release of the means to maintain the change in active material 216, the device 200 reverts back to the original at least one feature. In this manner, the device 200 may curve upward in response to the activation signal, maintain the upward curve until release of the means, where upon the device 200 will revert and straighten. Further, the airflow control device 200 can be restored and healed to a desired shape by heating the active material 216 to the appropriate temperature. In this manner, an airflow control device 200 that becomes deformed, such as during an impact, may be restored or healed to a desired shape by applying the appropriate temperature range. The selection of material comprising the body 212 and/or active material 216 will be determined by the desired application.

Figure 3A:
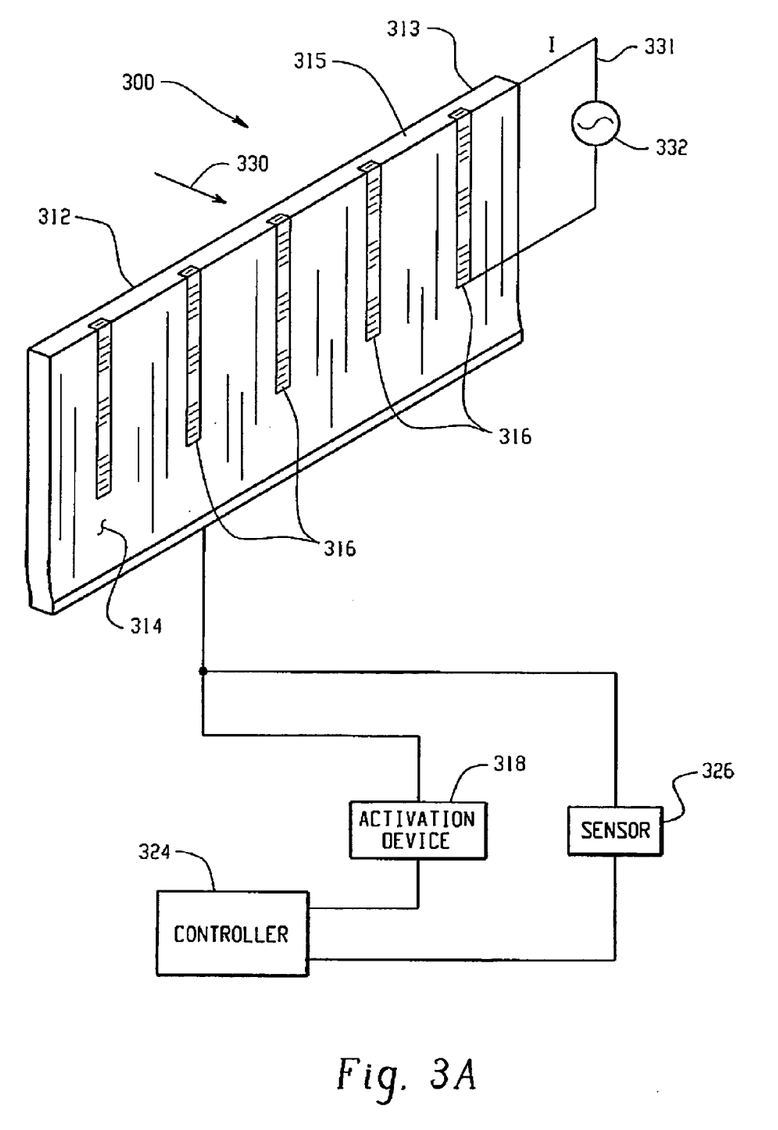
FIG. 3a is a perspective view of an airflow control device having active material embedded within a surface of the body in accordance with an embodiment of the present disclosure.
Figure 3B:
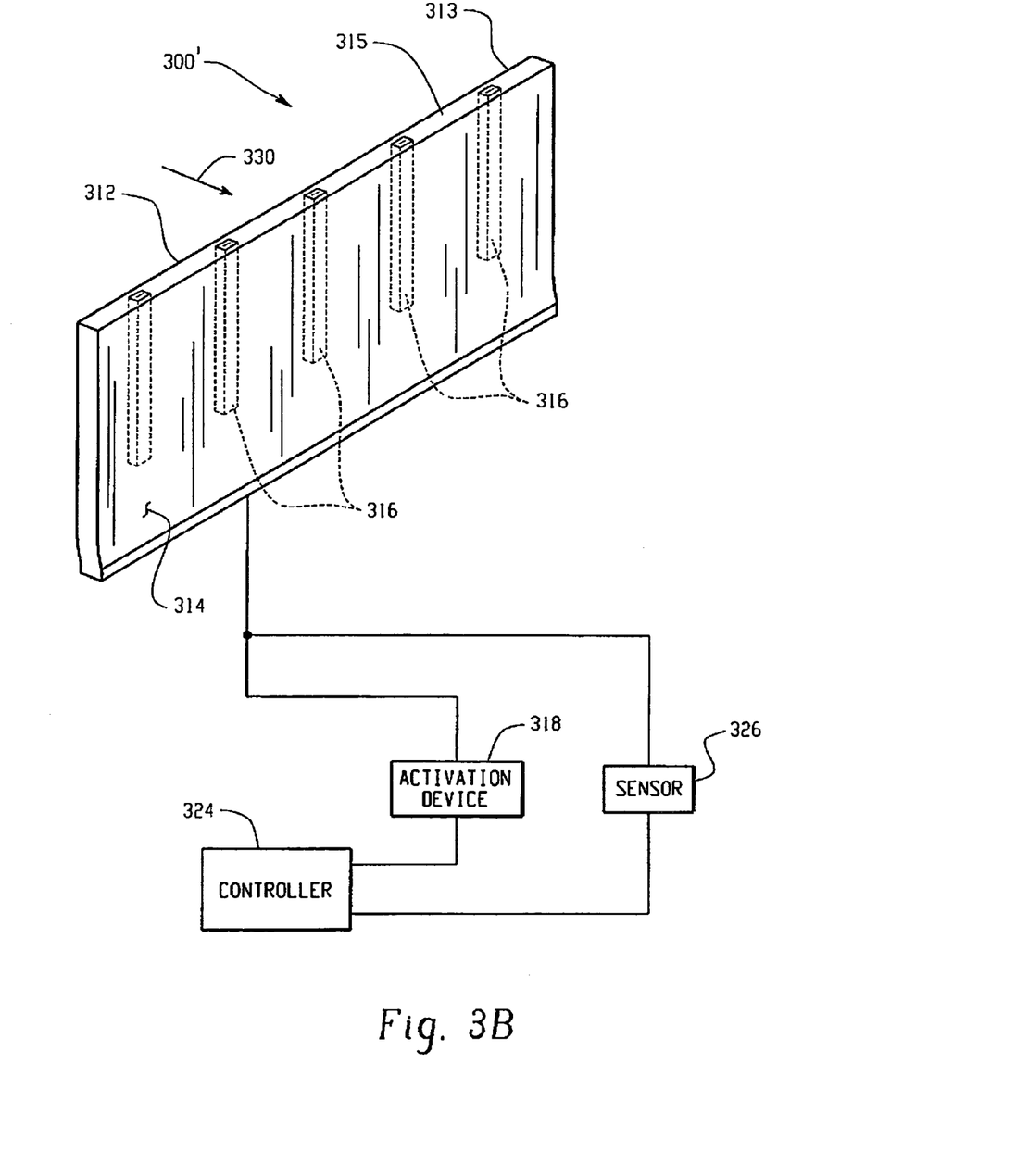
FIG. 3b is a perspective view of an airflow device having active material embedded within the body in accordance with an embodiment of the present disclosure.

As shown in FIGS. 3A and 3B, perspective views of an airflow control device designated as reference numeral 300, are shown, having strips and/or sections formed of active material 316. In FIG. 3a, the device 300 comprises strips and/or sections of active material 316 embedded on surface 314 of the body 312. However, it should be noted that the active material 316 could be embedded in any one or more of the surfaces 313, 314, and 315 that define the airflow control device 300. In an alternate embodiment shown in FIG. 3B, the strips and/or sections of active material 313 are embedded within the body 312 as shown in the device 300'. In these embodiments, the body 312 comprises a flexible matrix material with strips of active material 316, preferably but not necessarily, embedded at regular intervals. The placement of the active material 316 is not limited to any particular configuration or pattern and will be determined by the desired application of the device 300, 300'. In one embodiment, as in strips of SMA, the active material 316 has a trained curved shape in the austenite phase, not shown in this view. At standing or low vehicle speeds, the active material 316 may be heated through resistance heating which may cause the active material 316 to change its shape to a curvilinear shape and in doing so curl the airflow control device 300 or 300' up and out of the external airflow such as may be provided in the direction indicated by arrow 330. The change in shape may be initiated by an activation signal transmitted by activation device 318, controller 324, and/or sensor 326. For example, as previously discussed the activation device 318 can provide an electrical signal, e.g., a current, to resistively heat the shape memory alloy wires as shown in FIG. 3A. One of skill in the art would know that to resistively heat a wire such as the shape memory alloy disclosed herein, one simply flows a current I from a power source 332 through a circuit 331 that includes the shape memory alloy 316. The shape memory alloy strips 316 can be in series, in parallel, or individually coupled to the circuit. The current I flowing through the circuit 33 1 will resistively heat the shape memory alloy as a function of the resistance provided by the shape memory alloy 316.

As a result of the change in phase, the stiffness of the SMA active material 316 in the austenite phase will be greater than the stiffness in the martensite phase. The number and size of the embedded active material strips may be chosen such that when in the austenite phase the embedded active material 316 causes the bulk of the airflow control device 300 to deform. However, when the active material 316 is in the martensite phase, the flexible material comprising the bulk of the airflow control device 300, 300' is sufficiently stiff to return the device 300 to a straight, deployed configuration, and in doing so straightening the active material 316. At higher speeds, in excess of a predetermined vehicle speed, the current flow causing resistant heating may be stopped, causing the active material 316 to return to the martensite phase. In this manner, the airflow control device 300, 300' reverts to a straightened deployed state. As previously discussed, the airflow control device 300, 300' may be restored if deformed as a result of force, such as an impact, due to plastic deformation of the strips of active material 316 by heating the active material 316 to the austenite phase temperature.

Figure 4:
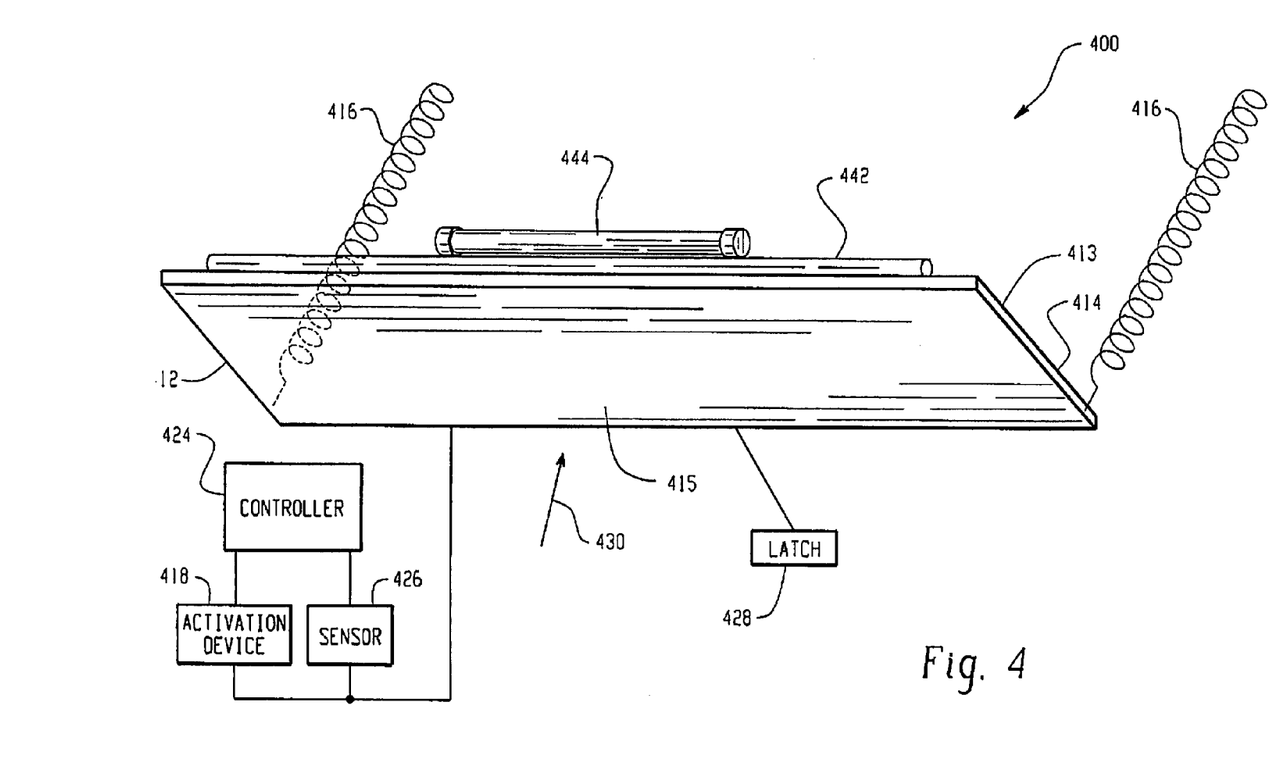
FIG. 4 is a perspective view of the airflow control device wherein an active material is connected externally to the surface of the airflow control device in accordance with an embodiment of the present disclosure.

In an additional embodiment, shown in FIG. 4, a perspective view of an airflow control device 400 comprises active material 416 in the shape of helical springs positioned in functional operation to the body 412 of the airflow control device 400. In this embodiment, the active material 416 may be connected externally either directly or remotely to a selected surface 413, 414, 415 defining the body 412 of the airflow control device 400. As shown in FIG. 4, a surface 413 of the body 412 is coupled with a hollow tube 442 in such a fashion that the hollow tube 420 is free to rotate about its axis. A biased spring mechanism 442 and the active material 416 are both coupled to the hollow tube 420 in an opposing fashion such that their respective tensions balance each other. In this manner, the rotation of the hollow tube 442 through external means may increase the tension in one direction while reducing tension in the other direction. At low vehicle speeds (i.e., less than a predetermined speed), tension in the spring mechanism 444 combined with reduced stiffness and greater length of an unheated active material 416 results in rotation of the airflow control device 400 out of the airflow such as may be provided in the direction indicated by arrow 430. At higher speed (i.e., greater than the predetermined speed), the temperature of the active material 416 can be raised through resistance heating or conductive heating such as immersion into engine coolant or the like to produce a phase change in the active material 416 from the martensite phase to the austenite phase. The wires comprised of active material 416 preferably exhibit up to about a 4 percent (%) reduction in length with an up to 3 times increase in stiffness properties. In this manner, the combined reduction in length and increase in stiffness properties can result in deployment of the airflow control device 400, e.g., such as rotation of the tube 442 and stretching of the counter-balancing spring mechanism 444. Upon discontinuation of the resistance heating, the active material 416 cools to the martensite phase and the stretched spring mechanism 444 can be used to return the airflow control device 400 to a stowed position. In another embodiment, the change in one or more attribute of the active material 416 and/or feature of the device 400 may remain upon discontinuing the activation signal. In this embodiment, the device 400 includes a means to maintain the change in active material 416, such as a latch 428, lock, stop and/or the like. Upon release of the means to maintain the change in active material 416, the device 400 reverts back to the original at least one feature. As previously discussed, the activation device 418, controller 424 and/or sensor 426 may function with each other and the airflow control device 400 to initiate the changes in at least one attribute of the active material 416.

A method of controlling vehicle airflow is disclosed. In this embodiment, the method first comprises positioning the airflow controlling device 10, 200, 300, or 400 so as to provide airflow in contact during movement of the vehicle, the airflow controlling device comprising a body and an active material in operative communication with the body, wherein the active material is operative to change at least one attribute in response to an activation signal. Once positioned, an activation signal is selectively introduced to the active material e.g., 16, 216, 316, 416. By selectively introducing the activation signal, at least one attribute of the active material changes. In another embodiment, the method includes discontinuing the activation signal to reverse the change of at least one attribute of the active material. In an additional embodiment, the method includes maintaining the change in at least one attribute of the active material upon discontinuation of the activation signal.

As previously discussed, suitable shape memory materials that can undergo a shape change in response to an activation signal include shape memory alloy compositions. Shape memory alloys exist in several different temperature-dependent phases. The most commonly utilized of these phases are the so-called martensite and austenite phases discussed above. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$). When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). Generally, the shape memory alloys are softer and more easily deformable in their martensitic phase and are harder, stiffer, and/or more rigid in the austenitic phase. In view of the foregoing, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape that was previously suitable for airflow control.

Intrinsic and extrinsic two-way shape memory materials are characterized by a shape transition both upon heating from the martensite phase to the austenite phase, as well as an additional shape transition upon cooling from the austenite phase back to the martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the airflow control devices with shape memory effects, superelastic effects, and high damping capacity.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape, changes in yield strength, and/or flexural modulus properties, damping capacity, and the like. A preferred shape memory alloy is a nickel-titanium based alloy commercially available under the trademark NITINOL from Shape Memory Applications, Inc.

Another suitable class of shape memory materials is SMP's. To set the permanent shape of the active material 16 the polymer must be at about or above the Tg or melting point of the hard segment of the polymer. "Segment" refers to a block or sequence of polymer forming part of the SMP. The SMP active materials 16 are shaped at this temperature with an applied force followed by cooling to set the permanent shape. The temperature necessary to set the permanent shape is between about 100° C. to about 300° C. Setting the temporary shape of the SMP material requires the SMP material to be brought to a temperature at or above the Tg or transition temperature of the soft segment, but below the Tg or melting point of the hard segment. At the soft segment transition temperature (also termed "first transition temperature"), the temporary shape of the SMP material is set followed by cooling of the SMP to lock in the temporary shape. The temporary shape is maintained as long as the SMP elements remain below the soft segment transition temperature. The permanent shape is regained when the SMP elements are once again brought to or above the transition temperature of the soft segment. Repeating the heating, shaping, and cooling steps can reset the temporary shape. The soft segment transition temperature can be chosen for a particular application by modifying the structure and composition of the polymer. Transition temperatures of the soft segment range from about −63° C. to above about 120° C.

Shape memory polymers may contain more than two transition temperatures. An SMP composition comprising a hard segment and two soft segments can have three transition temperatures: the highest transition temperature for the hard segment and a transition temperature for each soft segment. The presence of the second soft segment allows for the SMP composition to exhibit two permanent shapes.

Most shape memory polymers exhibit a "one-way" effect, wherein the SMP exhibits one permanent shape. Upon heating the SMP above the first transition temperature, the permanent shape is achieved and the shape will not revert back to the temporary shape without the use of outside forces. For example, for active materials which exhibit differences in stiffness of the activated and non-activated states, energy may be stored elastically during the activation of the airflow control device 10, 200, 300, 400. As such, the energy may be stored in any manner suitable for operation of the airflow control device 10, 200, 300, 400 including, but not limited to, within the body (e.g., 12, 212, 312, 412) of the device 10, 200, 300, 400 and/or in elastic components such as springs which operate internally to and/or externally connected to the device 10, 200, 300, 400. In this manner, the stored energy is available to revert the device 10, 200, 300, 400 to an original state of at least feature such as shape, dimension, stiffness, location and/or orientation upon discontinuation of an activation signal and/or release of a means, such as a latch, lock, stop and/or the like, as discussed herein. In another example, more than one active materials which exhibit differences in stiffness of the activated and non-activated states are oriented so as to oppose the change in at least one attribute each produces. As such, one or more opposing active material may be selectively activated without the activation of other opposing active materials. In this manner, the change in at least one attribute of the selectively activated active material may be reversed by deactivating the activated active materials, and selectively activating other opposing active materials. Alternatively, the active material can be activated during a no load condition so as to permit reversion to its original shape. The above-mentioned examples are illustrative and do not limit the embodiments of the present disclosure.

As an alternative, some shape memory polymer compositions can be prepared having a "two-way" effect. These systems consist of at least two polymer components. For example, one component could be a first cross-linked polymer while the other component is a different cross-linked polymer. The components are combined by layer techniques, or are interpenetrating networks, wherein two components are cross-linked but not to each other. By changing the temperature, the shape memory polymer changes its shape in the direction of the first permanent shape or the second permanent shape. Each of the permanent shapes belongs to one component of the shape memory polymer. The two permanent shapes are always in equilibrium between both shapes. The temperature dependence of the shape is caused by the fact that the mechanical properties of one component ("component A") are almost independent from the temperature in the temperature interval of interest. The mechanical properties of the other component ("component B") depend on the temperature. In one embodiment, component B becomes stronger at low temperatures compared to component A, while component A is stronger at high temperatures and determines the actual shape. A two-way memory device can be prepared by setting the permanent shape of component A ("first permanent shape"); deforming the device into the permanent shape of component B ("second permanent shape"); and fixing the permanent shape of component B while applying a stress to the component.

In a preferred embodiment, the permanent shape of the active material e.g., 16, 216, 316, 416 is a substantially straightened shape and the temporary shape of the active material is a curved shape (see, for example, FIGS. 2A and 2B). In another embodiment, the shape memory polymer comprises two permanent shapes. In the first permanent shape the active materials are in a substantially straightened shape and in the second permanent shape, the active materials are in a curved shape.

The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., and most preferably less than or equal to about 120° C. and greater than or equal to about 80° C.

Shape memory polymers can be thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly (ethylene terephthalate), polyethylene/nylon (graft copolymer), polycaprolactones-polyamide (block copolymer), poly (caprolactone) dimethacrylate-n-butyl acrylate, poly (norbornyl-polyhedral oligomeric silsequioxane), polyvinylchloride, urethane/butadiene copolymers, polyurethane block copolymers, styrene-butadiene-styrene block copolymers, and the like.

As previously mentioned and defined, the active material 16 may also comprise an electroactive polymer such as ionic polymer metal composites, conductive polymers. The active material 16 may also comprise a piezoelectric material. Preferably, a piezoelectric material is disposed on strips of a flexible metal sheet. The strips can be unimorph or bimorph. Preferably, the strips are bimorph, because bimorphs generally exhibit more displacement than unimorphs.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. Unimorphs can exhibit a strain of as high as about 10%, but generally can only sustain low loads relative to the overall dimensions of the unimorph structure. A commercial example of a pre-stressed unimorph is referred to as "THUNDER", which is an acronym for THin layer composite UNimorph ferroelectric Driver and sEnsoR. THUNDER is a composite structure constructed with a piezoelectric ceramic layer (for example, lead zirconate titanate), which is electroplated on its two major faces. A metal pre-stress layer is adhered to the electroplated surface on at least one side of the ceramic layer by an adhesive layer (for example, "LaRC-SI®" developed by the National Aeronautics and Space Administration (NASA)). During manufacture of a THUNDER actuator, the ceramic layer, the adhesive layer, and the first pre-stress layer are simultaneously heated to a temperature above the melting point of the adhesive, and then subsequently allowed to cool, thereby re-solidifying and setting the adhesive layer. During the cooling process the ceramic layer becomes strained, due to the higher coefficients of thermal contraction of the metal pre-stress layer and the adhesive layer than of the ceramic layer. Also, due to the greater thermal contraction of the laminate materials than the ceramic layer, the ceramic layer deforms into a shape having a generally concave face.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the bimorph structure.

Suitable piezoelectric materials include, but are not intended to be limited to, inorganic compounds, organic compounds, and metals. With regard to organic materials, all of the polymeric materials with noncentrosymmetric structure and large dipole moment group(s) on the main chain or on the side-chain, or on both chains within the molecules, can be used as candidates for the piezoelectric film. Examples of suitable polymers include, for example, but are not limited to, poly(sodium 4-styrenesulfonate) ("PSS"), poly S-119 (poly(vinylamine)backbone azo chromophore), and their derivatives; polyfluorocarbons, including polyvinylidenefluoride ("PVDF"), its co-polymer vinylidene fluoride ("VDF"), trifluoroethylene (TrFE), and their derivatives; polychlorocarbons, including poly(vinyl chloride) ("PVC"), polyvinylidene chloride ("PVC2"), and their derivatives; polyacrylonitriles ("PAN"), and their derivatives; polycarboxylic acids, including poly(methacrylic acid ("PMA"), and their derivatives; polyureas, and their derivatives; polyurethanes ("PUE"), and their derivatives; biopolymermolecules such as poly-L-lactic acids and their derivatives, and membrane proteins, as well as phosphate bio-molecules; polyanilines and their derivatives, and all of the derivatives of tetramines; polyimides, including Kapton molecules and polyetherimide ("PEI"), and their derivatives; all of the membrane polymers; poly(N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains, and mixtures thereof.

Further, piezoelectric materials can include Pt, Pd, Ni, Ti, Cr, Fe, Ag, Au, Cu, and metal alloys and mixtures thereof. These piezoelectric materials can also include, for example, metal oxide such as $SiO_2$, $Al_2O_3$, $ZrO_2$, $TiO_2$, $SrTiO_3$, $PbTiO_3$, $BaTiO_3$, $FeO_3$, $Fe_3O_4$, ZnO, and mixtures thereof; and Group VIA and IIB compounds, such as CdSe, CdS, GaAs, AgCaSe 2, ZnSe, GaP, InP, ZnS, and mixtures thereof.

Employing the piezoelectric material will likely need an electrical signal to produce a curved shape. Upon discontinuation of the activation signal, the activation material to straighten.

Active materials also include, but are not limited to, shape memory materials such as magnetic materials, ferromagnetic shape memory alloys magnetorheological elastomers, and the like.

Suitable magnetic materials include, but are not intended to be limited to, soft or hard magnets; hematite; magnetite; magnetic material based on iron, nickel, and cobalt, alloys of the foregoing, or combinations comprising at least one of the foregoing, and the like. Alloys of iron, nickel and/or cobalt, can comprise aluminum, silicon, cobalt, nickel, vanadium, molybdenum, chromium, tungsten, manganese and/or copper.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

The airflow control devices 10, 200, 300, 400 and methods of the present disclosure are able to adjust features such as shape, dimension, stiffness, location, combinations thereof, and the like by changing the at least one attribute of active material to match the needs of different driving conditions. Changes in at least one attribute of active material include shape, dimension, stiffness, combinations thereof and the like. Utilizing active materials to effect these changes provide a device 10, 200, 300, 400 of increased simplicity and robustness, while reducing the number of failure modes, device volume and energy requirements for activation due to higher energy densities.

Unless otherwise indicated, all numbers expressing quantities of ingredients, properties such as molecular weight, reaction conditions, and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

The following prophetic examples are directed to airflow devices for regulating airflow through and/or across a radiator, a fuel cell compartment, a fuel cell, and/or engine compartment in a vehicle. However, it should be understood that the airflow devices can be configured and adapted for use in other parts of the vehicle such as, but not intended to be limited to, airflow control over the transmission housing, the air conditioner heat exchanger, the brakes, through wheel openings, and the like. Moreover, the airflow device can be employed for liquid flow control such as may be desired for controlling liquid flow through and within a radiator system.

EXAMPLE 1

In this example, the airflow control device can be formed of an active material such as has been previously described in relation to FIG. 1. The airflow device is positioned in a cooperating relationship with the hood and/or the front grill, and/or the underside of the vehicle, and/or the forward portion of the vehicle side. In other words, the airflow device can be positioned anywhere on and/or in the vehicle that will provide a selectively controlled airflow across and through the radiator, fuel cell, fuel cell compartment, engine, and/or engine compartment.

By way of illustration, the airflow device in the form of louvers can be fabricated from a shape memory polymer. Resistive wires are embedded in the SMP louvers to provide selective resistive heating such as is shown in FIGS. 2A and 2B. The wiring is in operative communication with a control module for selectively introducing current to the wires such as, for example, when the coolant temperature exceeds a threshold value. The current flow would, through resistive heating, raise the temperature of the SMP in an amount effective to reduce the modulus and/or stiffness of the SMP, e.g., the temperature would be greater than a glass transition temperature of at least one of the components forming the shape memory polymer. Pressure loading by ram air would then cause a change in the shape of the louvers to provide airflow through the louvers, or increase the airflow flowing through the louvers. By the term "ram air" it is meant the air impacting the vehicle during operation thereof. In this manner, airflow through and across the radiator, fuel cell, fuel cell compartment, engine, and/or engine compartment would be provided upon the change in shape orientation, modulus and/or flexural stiffness in the louvers.

Upon continued operation, the control module can selectively discontinue current flow through the wires. The continuation of the aero loads can be used to set the louvers in the curved/opened configuration. If the original orientation is desired, the control module can be selected to provide a current effective to heat the SMP above its transition temperature (i.e., glass transition temperature for at least one component) during a no load condition such as when the vehicle is stationary. The control module can be programmed with a suitable algorithm as is known in the art using inputs such as vehicle speed, air speed from an anemometer, or the like to indicate a no load condition.

EXAMPLE 2

In this example, portions of the airflow control device are formed of the active material. As in Example 1, the airflow device is in the form of louvers and is positioned to provide controlled airflow or increased airflow across and/or through the radiator, fuel cell, fuel cell compartment, engine, and/or engine compartment. The louver can comprise thin strips of a shape memory alloy, for example, that are embedded at regular spaced intervals from top to bottom across a width of the louvers, such as is shown in FIG. 3. The shape memory alloy has a trained curvilinear shape at high temperatures, e.g., temperatures greater than the austenite transition temperature.

During operation when coolant air is desired, the SMA portions are heated through resistance heating so as to assume their high temperature trained curvilinear shape, which increases airflow through the louvers. The number and size of the SMA portions are chosen to cause deformation of the remaining (non-SMA) portions of the louver when the austenite temperature is exceeded. The non SMA material is comprised of a material that has a lower stiffness function than the stiffness function of the SMA material when heated to or greater than the austenite transition temperature, resulting in a suitable amount of deformation to the louver to permit increased airflow. At temperatures less than the austenite phase, the stiffness function of the bulk louver material is higher than the SMA material, thereby causing the louver to assume its original shape orientation, e.g., a closed position.

At lower coolant temperatures, the resistance heating of the SMA is terminated, which causes the SMA to return to the lower transition temperature Martensite phase that exhibits a lower stiffness function than the austenite phase. In this manner, the louvers are closed. It should be noted that the louver can be restored if deformed by an impact event, for example. Restoration would simply include heating the SMA portions to a temperature exceeding the austenite phase transition.

EXAMPLE 3

In this example, louvers can be formed of any suitable material, including but not limited to, thermoplastics, metals, shape memory materials, and the like, and positioned as in Example 1. The louvers are connected to an externally controlled mechanism based on a shaped memory material similar to that shown in FIG. 4. For example, an upper edge of a louver is connected to a rod, which can rotate about its axis to change the relative position of the louver. A conventional spring and an SMA wire are attached to the rod in opposing fashion such that the tensions balance one another. As such, rotation of the rod will cause tension in the rod or the SMA wire depending on the rotation direction.

At low coolant temperatures, the tension in the spring in combination with the reduced stiffness and increased length (martensite phase) of the SMA maintains the louver in a closed position. Applying sufficient heat to exceed the austenite transition temperature causes stiffening and contraction of the SMA wire causing the louver to rotate to an open position such as may be desired when the coolant temperature exceeds a threshold value. Sufficient heat can be applied by conduction by the environment (i.e., immersing the SMA directly into the engine coolant) by resistance heating, by microwave heating, by convection, by irradiation, and by application of other like energy sources. The combined reduction in length and increased stiffness overcomes the tensile forces in the spring, thereby causing the spring to elongate.

Discontinuing the current or cooling the environment to effect a change in temperature below the austenite phase transition to the martensite phase will cause the louver to return to the closed position.

Figure 5:
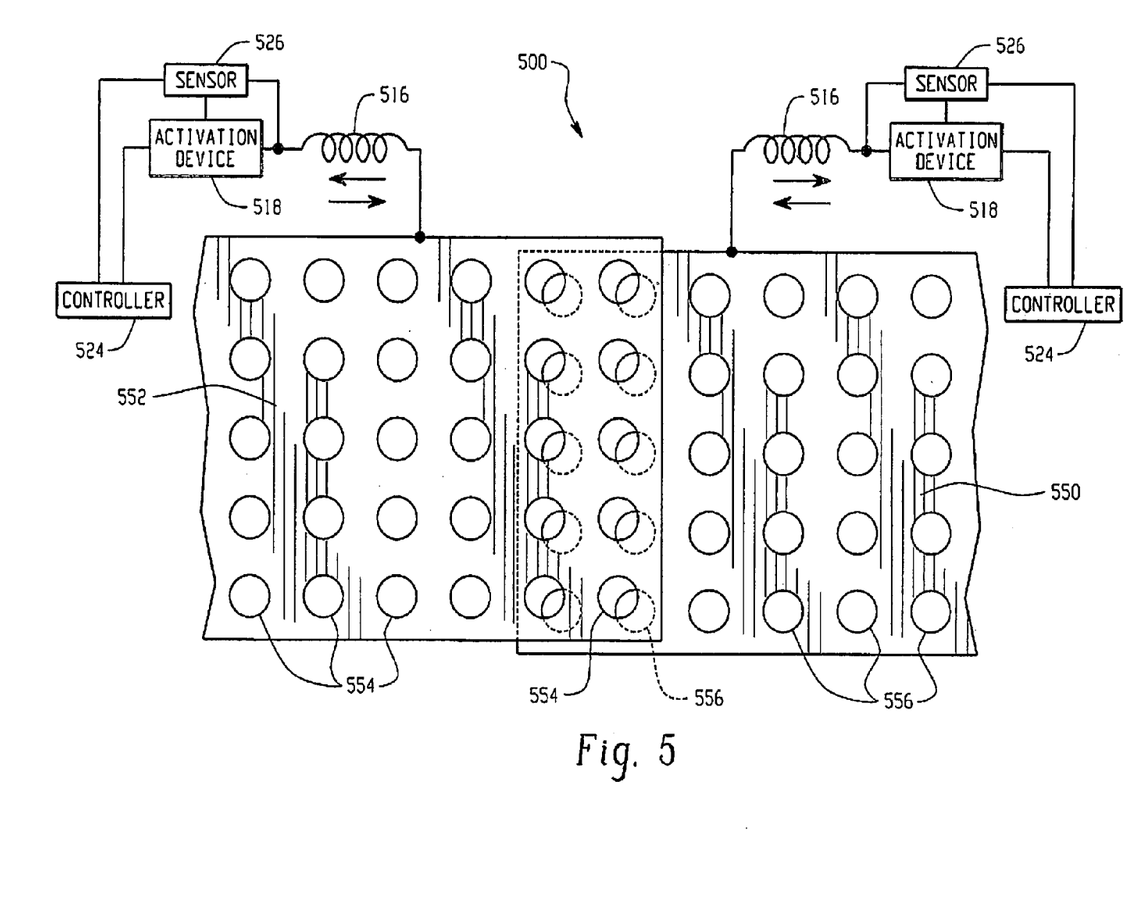
FIG. 5 is a perspective view of a radiator airflow control system for a vehicle.

This disclosure is also intended to encompass the use of active material based actuation mechanisms for other variations of fluid control louvers known to those skilled in the art. For example, as shown in FIG. 5, the airflow control device 500 may comprise two or more perforated flat sheets 500, 552 slidingly engaged against one another. The airflow control device 500 can be positioned for controlling airflow through a component such as the radiator, other heat exchangers, the engine compartment, fuel cell compartment, fuel cell, fuel cell cooling system, wheel wells, over the drive train and transmission, air and wind deflectors for roof top, sunroof vent windows, louvers in the wheel well which are adapted to effect brake cooling. Perforations 554, 556 in the sheets, respectively, can take various forms including holes and slots and preferably would be of identical patterns in the two sheets. Each sheet 550, 552 would be fixedly attached to an active material based actuator 5 516, which is shown in the form a helical spring in operative communication with the activation devices 518, controller 524 and/or sensor 526 may function with each other and the airflow control device 500 to initiate the changes in at least one attribute of the active material 500. Although a helical spring is shown, other shapes and forms are contemplated such as those previously discussed for the various other embodiments. In-plane sliding of the two sheets 500, 552 with respect to each other would alter the alignment of the perforations 554, 556 in the two sheets 500, 552 and thereby alter the area of perforation overlap, i.e. the through-flow area. The maximum through-flow (void) area that could be obtained with two sheets would be 50% (three sheets 67%; four sheets 75%; 5 sheets 80%, etc.) this being achieved with two sheets with identical perforation patterns of the following specific form, e.g., alternating slots and solid regions of equal width and spacing. The number and shape of the perforations as well as the number of sheets will depend on the desired application and desired airflow pattern and volume. This approach of sliding sheets, while limiting the effective flow area, advantageously provides an actuation direction perpendicular to that of fluid pressure loading so that the forces required for actuation are essentially independent of fluid velocity/pressure. Also, by keeping the common dimension of slot spacing and width relatively small, the linear motion required of the actuator is also minimized. The relatively small actuation forces and small displacements required by this stacked perforated sheet form of louvers make it quite consistent with the capabilities of EAP, MR rubber, and SMA wire based means of actuation.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. A process for controlling airflow through and/or across a component, comprising:
    disposing at least one louver airflow control device positioned in an airflow path, wherein the at least one airflow control device louver comprises a shape memory polymer or a shape memory alloy and at least one resistive wire embedded in thermal communication with the shape memory polymer; and
    selectively flowing current through the at least one resistive wire and heating the shape memory polymer or flowing current through the shape memory alloy and heating the shape memory alloy to a temperature effective to change at least one attribute, wherein the change in at least one attribute selectively increases or decreases the airflow through the airflow path.

2. The process according to claim 1, further comprising terminating the flow of current and fixing a position shape of the at least one louver airflow control device.

3. The process according to claim 1, wherein fixing the position a shape of the at least one air flow control device louver comprises applying an airflow load to the at least one airflow control device louver.

4. The process according to claim 1, wherein fixing the position a shape of the at least one louver airflow control device comprises applying no airflow load to the at least one airflow control device louver.

* * * * *